July 7, 1931.   H. C. H. TOWNEND   1,813,645
MEANS FOR REDUCING EDDY FORMATION IN THE
AIRFLOW PASSING AIRCRAFT BODIES
Filed July 2, 1929   2 Sheets-Sheet 1

Patented July 7, 1931

1,813,645

UNITED STATES PATENT OFFICE

HUBERT CHARLES HENRY TOWNEND, OF TEDDINGTON, ENGLAND, ASSIGNOR TO BOULTON & PAUL LIMITED, OF RIVERSIDE WORKS, NORWICH, NORFOLK, ENGLAND

MEANS FOR REDUCING EDDY FORMATION IN THE AIRFLOW PASSING AIRCRAFT BODIES

Application filed July 2, 1929, Serial No. 375,371, and in Great Britain July 10, 1928.

It has been common for many years to apply fairings to struts and other obstructions on aircraft in order to lessen the drag or resistance they create in being drawn through the air. Engine cylinders and other excrescences projecting into the airstream flowing past aircraft bodies, have been faired for the purpose of reducing head resistance and have also been provided with baffles for deflecting the airstream on to such engine cylinders for cooling purposes.

The object of the present invention is to reduce to a minimum the turbulence which is created by engine cylinders or other excrescences which project outwardly from aircraft bodies into the airstream flowing past said bodies, by these excrescences diverting the airstream out of its normal path against the body and thus reduce considerably the drag caused by said turbulence.

This invention comprises in combination an aircraft body, excrescences located at the leading end of said body and an annular aerofoil located around said excrescences, and adapted to maintain the airstream against the body so that it is not thrown outwards by the excrescences to any appreciable extent. Turbulence which otherwise would create considerable drag is thus reduced to a minimum.

As applied to reducing turbulence created by the ends of the cylinders of a stationary radial engine projecting from the forward portion of a stream-lined aircraft body, a ring of aerofoil cross section is applied in front of or around the engine, the aerofoil attitude of each portion of the said ring being so designed that when applied to the aircraft body, the aerofoil has a high lift coefficient.

In the case of the excrescence or excrescences not extending completely round the aircraft body, a sector only of the aerofoil ring need be applied, and the aerofoil may be composed of several spans of aerofoils connected together, which combine to form a polygon or a portion of a ring or polygon.

The aerofoils may be of single thickness, or they may be hollow, in which latter case the interior of the aerofoil or aerofoils may be used for cooling or otherwise exchanging temperature between gases or liquids circulated in the aerofoils or in tubes in the aerofoils.

To obtain the best results, the particular cross section of the ring or polygon and its orientation (i. e. its incidence relative to the local airflow) must be determined with due regard to the shape of the body, and the relative positions of the excrescences or irregularities.

Figure 1:
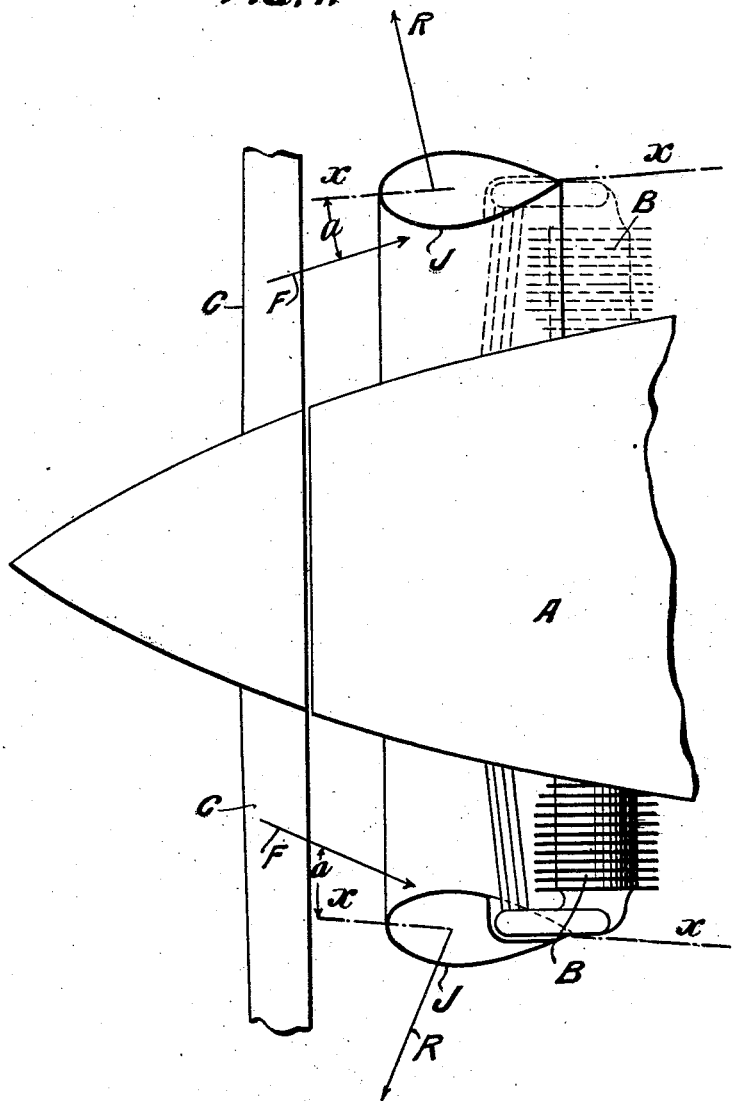
Figure 2:
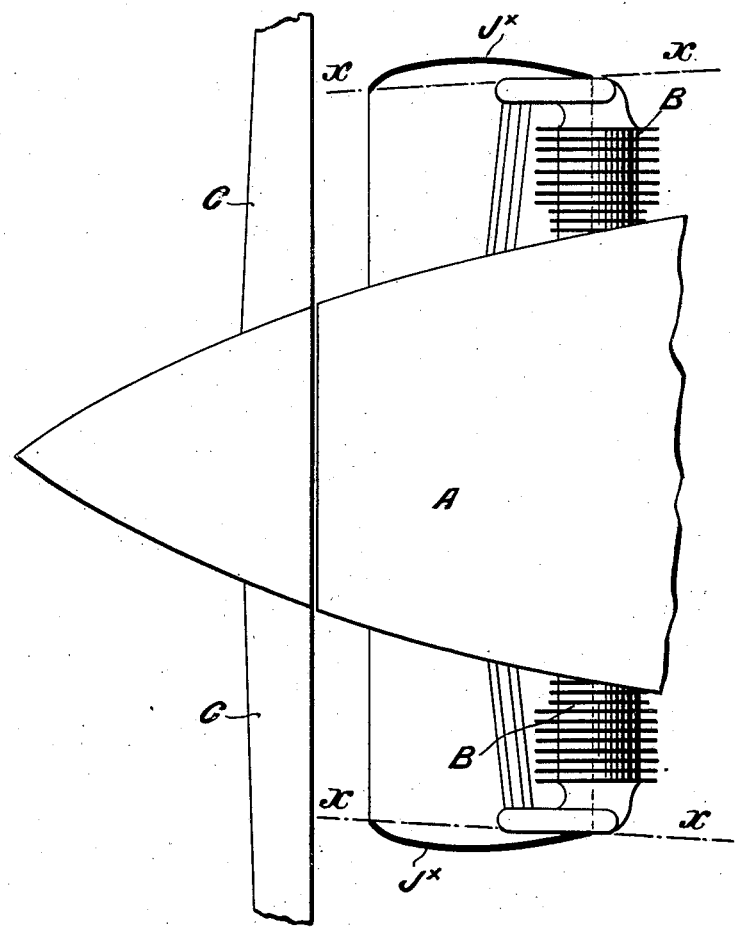

The invention is illustrated diagrammatically and by way of example in Figures 1 and 2 of the accompanying drawings which show two different sections of aerofoils for reducing eddy formation.

In the drawings the letter A indicates the nose of a streamline aircraft body or engine nacelle of conventional form having a low drag coefficient with stationary radial engine cylinders B protruding from the surface of the body and an aerofoil J (see Fig. 1) or J$^\times$ (see Fig. 2) partly in front of and partly overlapping the cylinders. This arrangement which is aerodynamically good also gives easy access to valves or sparking plugs. C is the airscrew.

The chord $x$—$x$ of the aerofoil is arranged at such an angle of incidence relative to the local airflow as to produce a downwash towards the surface of the body. In the drawings the lines F indicate the airflow, angle $a$ is the positive angle of incidence referred to in the claims and lines R indicate the resultant lift force on each section. The angle of incidence should preferably be such that the section works at a high lift coefficient but not high enough to run the risk of stalling. The downwash prevents the cylinders from causing the flow to break away from the body and reduces the size of the eddying wake.

The aerofoil is shown supported by being attached to the engine cylinders, but it may be supported by any other convenient means.

The aerofoil J (see Fig. 1) is of symmetrical streamline section and the aerofoil J$^\times$ (see Fig. 2) is a cambered plate of uniform thickness.

An aerofoil according to this invention may be applied to a groove formed by juxtaposed elements on an aircraft. For example an aerofoil formed as a strut may be arranged to connect the side of the fuselage to the surface of a main wing at the wing root at each side of the aircraft, for reducing the eddy formation caused by the mutual interference of such parts.

It is to be understood that the invention is not limited to the forms of construction and the arrangements shown, and that more than one aerofoil in superposed or staggered relation may be employed. It is also to be understood that turbulence set up by irregularities and excrescences other than engine cylinders, such for instance as wind screens and wing roots, may satisfactorily be fitted with aerofoils constructed in accordance with this invention.

The invention is differentiated aerodynamically from annular cowlings which have been employed with aircraft bodies and engines to act as fairings. Fairings chiefly act by (1) shielding an obstruction from the airflow, or (2) by occupying the region behind an obstruction which would otherwise be occupied by eddies, whereas an aerofoil member according to the present invention preserves the normal airflow past the cylinders.

What I claim as my invention and desire to secure by Letters Patent is:—

1. In combination, an aircraft body having radial engine cylinders projecting from the leading end of the body, and an annular aerofoil located around the radial cylinders and having its chord at each section at a positive angle of incidence giving a high lift co-efficient whereby the wash from the annular aerofoil is directed inwards to flow along the aircraft body.

2. In combination, an aircraft body having radial engine cylinders projecting from the leading end of the body and a single annular aerofoil located around the radial cylinders and having its chord at each section at a positive angle of incidence giving a high lift co-efficient whereby the wash from the annular aerofoil is directed inwards to flow along the aircraft body.

3. In combination, an aircraft body having radial engine cylinders projecting from the leading end of the body and an annular aerofoil located around the radial cylinders partly in advance of and partly overlapping said cylinders and having its chord at each section at a positive angle of incidence giving a high lift-co-efficient whereby the wash from the annular aerofoil is directed inwards to flow along the aircraft body.

In witness whereof I have hereunto set my hand.

HUBERT CHARLES HENRY TOWNEND.